S. W. GEERY.
Manufacture of Porcelain Mantels.

No. 220,279. Patented Oct. 7, 1879.

Attest:
M. T. Benjamin
E. A. Welsh

S. W. Geery
By his attorney
O. Drake

UNITED STATES PATENT OFFICE.

SAMUEL W. GEERY, OF NEWARK, NEW JERSEY.

IMPROVEMENT IN THE MANUFACTURE OF PORCELAIN MANTELS.

Specification forming part of Letters Patent No. 220,279, dated October 7, 1879; application filed April 6, 1878.

*To all whom it may concern:*

Be it known that I, SAMUEL W. GEERY, of the city of Newark, in the county of Essex and State of New Jersey, have invented certain new and useful Improvements in the Manufacture of Porcelain Mantels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to produce mantels of an extremely ornamental character at a low cost, and this I effect by molding porcelain material to the proper shape, and then baking and glazing the same, as described hereinafter.

Figure 1:
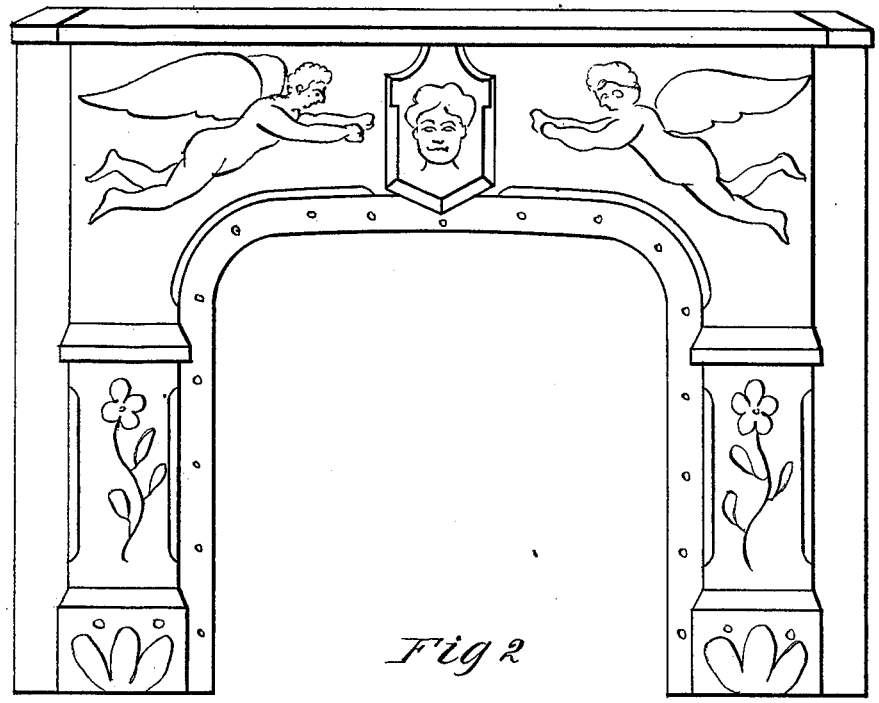
Figure 2:
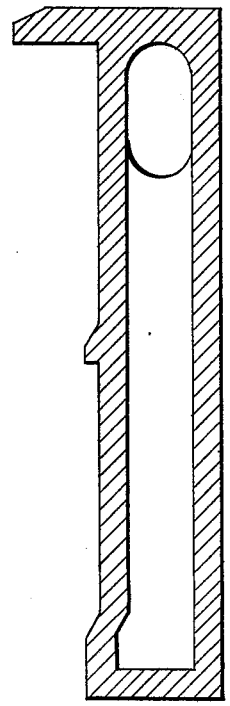

In the drawings forming part of this specification, Figure 1 is a front elevation of a mantel made in accordance with my invention; Fig. 2, a cross-section vertically.

The different sections, as $a$ $a'$ $b$ $b'$ $c$ $d$ $e$, are molded of plastic porcelain "body" or material in molds suitably shaped to impart the desired forms.

The molded pieces before baking or "burning" are then dipped in a solution of silica, (liquid glass,) and then baked either separately or are united, so that when finished the article will be in one piece.

By these means the article is easily and cheaply made of any desired form, and a high polish is imparted to the surface.

I do not claim molding nor glazing porcelain articles, as this is common; but

I claim—

The within-described improvement in the manufacture of mantels, consisting in forming the different sections in molds, glazing by immersing in a solution of silica, and then baking, as set forth.

In testimony that I claim the foregoing as my own I hereto affix my signature in presence of two witnesses.

SAMUEL W. GEERY.

Witnesses:
OLIVER DRAKE,
P. J. INSLEE.